United States Patent [19]
Shindo

[11] Patent Number: 5,963,515
[45] Date of Patent: Oct. 5, 1999

[54] OPTICAL PICKUP DEVICE FOR DETECTING A TRACKING ERROR OF A MAIN SPOT ON AN OPTICAL DISK

[75] Inventor: Hiroyuki Shindo, Chofu, Japan

[73] Assignee: Teac Corporation, Tokyo, Japan

[21] Appl. No.: 08/969,264

[22] Filed: Nov. 13, 1997

[30] Foreign Application Priority Data

Nov. 15, 1996 [JP] Japan .................................. 8-305139

[51] Int. Cl.$^6$ ...................................................... G11B 7/00
[52] U.S. Cl. ...................... 369/44.23; 369/112; 369/110; 369/109; 369/44.37
[58] Field of Search ............................. 369/44.23, 44.24, 369/44.37, 44.41, 44.42, 112, 109, 110

[56] References Cited

U.S. PATENT DOCUMENTS 5,751,680  12/1996  Ishibashi et al. ........................ 369/112

FOREIGN PATENT DOCUMENTS

| 55-113139 | 9/1980 | Japan | 369/44.37 |
| 58-147823 | 9/1983 | Japan | 369/44.37 |
| 3-12830 | 1/1991 | Japan | 369/44.37 |
| 5-234107 | 9/1993 | Japan | 369/44.37 |

OTHER PUBLICATIONS

Ohsato, K., "A New Tracking Servo Method: Differential Push–Pull Method", pp. 127–132, Optical Sumposium, 1986, Dec.

*Primary Examiner*—Nabil Hindi
*Attorney, Agent, or Firm*—Michael N. Meller; Eugene Lieberstein

[57] ABSTRACT

An optical pickup device includes a light source which emits a light beam. A beam converting system converts the light beam emitted by the light source into a main beam and four side beams so that a main spot and first through fourth side spots are provided on the disk by the main beam and the side beams. The first and the second side spots are at preceding positions to the main spot and the third and the fourth side spots are at following positions to the main spot. The first and the fourth side spots are symmetrical about the main spot and the second and the third side spots are symmetrical about the main spot. A photodetector receives reflection beams of the first through the fourth side spots and outputs signals indicating intensities of the reflection beams of the first through the fourth side spots. A tracking error detector outputs a tracking error signal in response to the signals output from the photodetector.

16 Claims, 6 Drawing Sheets

ON PHOTODETECTOR

OPTICAL PICKUP DEVICE FOR DETECTING A TRACKING ERROR OF A MAIN SPOT ON AN OPTICAL DISK

BACKGROUND OF THE INVENTION (1) Field of the Invention

The present invention relates to an optical pickup device in which a tracking error of a main spot on an optical disk is detected in response to reflection beams of side spots on the disk when information is read from or written to the disk, so as to trail a track of the disk at its exact position.

(2) Description of the Related Art

When an optical disk is inserted into an optical disk drive, the optical disk drive reads information from or writes information to the optical disk by using an optical pickup device. The optical pickup device emits a light beam to the disk, and detects a tracking error from reflection beams from the disk to which the emission beam is applied, in order to trail a track of the disk at the exact position. When the optical disk drive is operating in a reading mode, the optical pickup device detects pits in the track of the disk from the reflection beams in order to read data from the disk.

As described above, in the optical pickup device, a tracking error detection is carried out. The tracking error detection allows the emission beam to trail a track of the optical disk to the exact position when recording, playing or erasing information on the optical disk.

There are two principal types of optical disk drive: a read-only type and a rewritable type. The read-only optical disk drive reads information from an optical disk, such as CD (compact disk) and CD-ROM (compact disk-read-only memory). The rewritable optical disk drives can read information from and write information to an optical disk. Among the rewritable optical disk drives are a write-once disk system and an erasable disk system. The write-once disk system accesses an optical disk such as CD-R (compact disk-recordable), and can write data to the disk once only. The erasable disk system accesses an optical disk, such as PD (phase-change material disk) or CD-RW (compact disk-rewritable), and can write data to the disk many times.

There are three known methods of tracking error detection used by the existing optical disk drive: (1) a push-pull method, (2) a three-spot method, and (3) a differential push-pull method.

In the push-pull method, a single light beam emitted by a light source is used. The emission beam from the light source is directed to a track of the disk. A two-division photodetector receives reflection beams from the disk and outputs signals indicating intensities (or amounts of light) of the reflection beams. A tracking error signal is generated based on the signals output from the two-division photodetector.

When the push-pull method is used, an objective lens directing the emission beam to the disk is shifted in a radial direction of the disk, the reflection beams directed from the disk to the two-division photodetector are shifted. In this case, a tracking error signal having an offset caused by the radial shift of the objective lens is generated based on the signals output from the two-division photodetector. Even if a spot is located at the center of the track of the disk, the tracking error signal which is not equal to zero may be generated according to the push-pull method.

In the three-spot method, three spots (or a main spot and a pair of side spots) are arranged on the disk by a light beam emitted by a light source. Two different photodetectors individually receive reflection beams of the side spots on the disk, and each of the two photodetectors outputs a signal indicating the amount of light of a corresponding one of the reflection beams. A tracking error signal is generated based on a difference between the amounts of light indicated by the signals output from the two photodetectors.

When the three-spot method is used, the offset caused by a radial shift of the objective lens in the case of the push-pull method is not produced. However, when data is written to a blank area of a write-once optical disk or an erasable optical disk, the preceding one of the side spots to the main spot is located at the blank area in the disk and the following one of the side spots to the main spot is located at the recorded area in the disk. As the blank area and the recorded area in the disk have different reflectivities, the reflection beams directed from the disk to the photodetectors indicate a difference in the amount of light due to the different reflectivities. In such a case, a tracking error signal having an offset is generated based on the output signals of the two photodetectors. Even if the main spot is located at the center of the track of the disk, the tracking error signal which is not equal to zero may be generated according to the three-spot method. Therefore, the three-spot method is used only in an optical pickup device of the read-only type disk drive such as a CD-ROM drive or a MO (magneto-optical) disk drive.

In the differential push-pull method, a main spot and a pair of side spots are arranged on the disk by a light beam emitted by a light source. By using the push-pull method, a tracking error signal TE1 is generated based on the signals output in response to the reflection beam of the main spot on the disk, and two tracking error signals TE2 and TE3 are generated based on the signals output in response to the reflection beams of the side spots on the disk.

According to the differential push-pull method, a tracking error signal TE at an output of an optical pickup device is generated from the tracking error signals TE1, TE2 and TE3 in accordance with the following formula:

$$TE = TE1 - k(TE2 + TE3) \tag{1}$$

where k is a coefficient, TE1 is the tracking error signal for the reflection beam of the main spot, and TE2 and TE3 are the tracking error signals for the reflection beams of the side spots.

When the differential push-pull method is used, each of the tracking error signals TE1, TE2 and TE3 contains the offset caused by a radial shift of the objective lens in the case of the push-pull method, but the calculation of the above formula (1) eliminates the offset caused by the radial shift of the objective lens. Therefore, the tracking error signal TE output by the optical pickup device does not contain the offset caused by the radial shift of the objective lens.

However, when data is written to a blank area of a write-once optical disk or an erasable optical disk under a condition in which the objective lens is shifted in a radial direction of the disk, the differential push-pull method does not provide an accurate tracking error detection. As the blank area and the recorded area in the disk have different reflectivities, the reflection beams directed from the disk to the photodetectors indicate a difference in the amount of light due to the different reflectivities. In such a case, a tracking error signal TE having an offset is generated from the tracking error signals TE1–TE3 output by the photodetectors. Even if the main spot is located at the center of the track of the disk, the tracking error signal which is not equal to zero may be generated by the differential push-pull method. The differential push-pull method differs from the three-spot method in that the differential push-pull method can accurately detect a tracking error signal if the objective lens is not shifted in the radial direction of the disk.

Further, when the above-mentioned tracking error detection methods are used, a tracking error signal having a DC offset and an offset caused by the phase shift may be generated when data is written to a blank area of a write-once optical disk or an erasable optical disk under a condition in which the objective lens is shifted in a radial direction of the disk. It is difficult for the above-mentioned tracking error detection methods to provide an accurate tracking error detection in such a case.

SUMMARY OF THE INVENTION

An object of the present invention is to provide an improved optical pickup device in which the above-described problems are eliminated.

Another object of the present invention is to provide an optical pickup device which effectively eliminates the DC offset and the offset caused by the phase deviation so that a tracking error signal is accurately detected even when data is written to a blank area of a write-once optical disk or an erasable optical disk.

The above-mentioned objects of the present invention are achieved by an optical pickup device comprising: a light source which emits a light beam; a beam converting system which converts the light beam emitted by the light source into a main beam and four side beams so that a main spot and first through fourth side spots are provided on an optical disk by the main beam and the side beams, wherein the first and the second side spots are at preceding positions to the main spot and the third and the fourth side spots are at following positions to the main spot, and wherein the first and the fourth side spots are symmetrical about the main spot and the second and the third side spots are symmetrical about the main spot; a photodetector which receives reflection beams of the first through the fourth side spots and outputs signals indicating intensities of the reflection beams of the first through the fourth side spots; and a tracking error detector which outputs a tracking error signal in response to the signals output from the photodetector.

The above-mentioned objects of the present invention are achieved by an optical pickup device comprising: a light source which emits a light beam; a beam converting system which converts the light beam emitted by the light source into a main beam and four side beams so that a main spot and first through fourth side spots are provided on an optical disk by the main beam and the side beams, wherein the first and the second side spots are at preceding positions to the main spot and the third and the fourth side spots are at following positions to the main spot, and wherein the first and the fourth side spots are symmetrical about the main spot and the second and the third side spots are symmetrical about the main spot; a photodetector having photodetecting elements which receive reflection beams of the first through the fourth side spots and output signals indicating intensities of the reflection beams of the first through the fourth side spots; and a tracking error detector which outputs a tracking error signal in response to the signals output from the photodetector by adjusting the intensity of one of the reflection beams of the first and the fourth side spots and the intensity of one of the reflection beams of the second and the third side spots so as to be equal to each other.

In the optical pickup device of the present invention, it is possible to effectively eliminate the DC offset as well as the offset caused by the phase deviation. In addition, the tracking error detector outputs a tracking error signal based on the amounts of light of the reflection beams of the side spots on the disk by the tracking error detection according to the present invention, and it is possible for the optical pickup device of the present invention to effectively prevent the tracking error signal from containing the offset caused by a radial shift of the objective lens. Therefore, the optical pickup device of the present invention can provide an accurate tracking error detection even when data is written to a blank area of a write-once optical disk or an erasable optical disk.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figures 1, 1A, 1B:
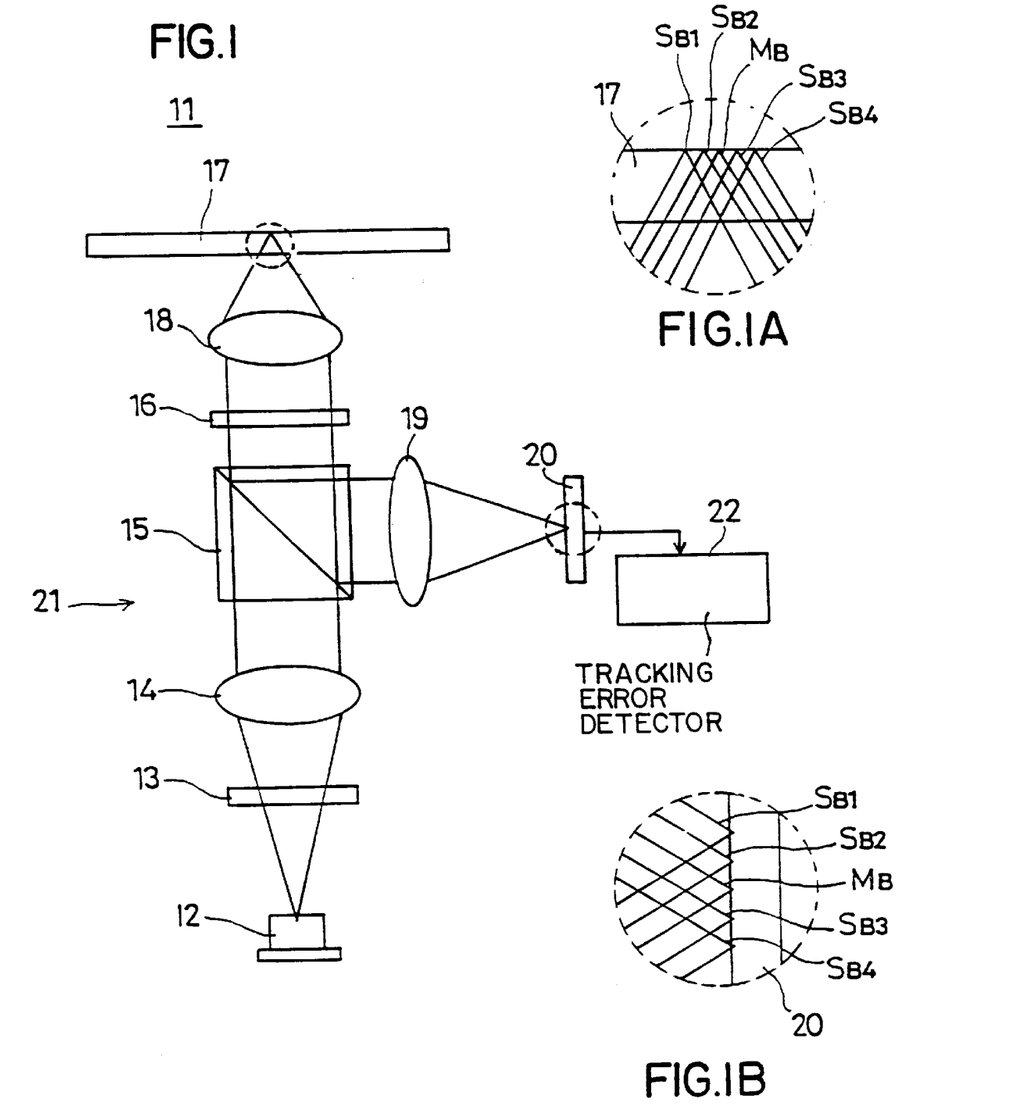
FIG. 1 is a diagram of a first embodiment of an optical pickup device of the present invention.

FIG. 1 shows a first embodiment of an optical pickup device of the present invention.

As shown in FIG. 1, an optical pickup device 11 generally has a laser diode (or a semiconductor laser) 12, a beam converting system 21, a photodetector 20, and a tracking error detector 22.

In the optical pickup device 11, the laser diode 12 is a light source which emits a laser beam used to access an optical disk 17. The beam converting system 21 converts the emission beam from the laser diode 12 into a main beam "MB" and plural side beams "SB1"–"SB4" so that a main spot and plural side spots are provided on the optical disk 17 by the main beam MB and the side beams SB1–SB4 respectively. A reflection beam of the main spot on the disk 17 is used to detect information of the disk 17, and reflection beams of the side spots on the disk 17 are used to detect a tracking error of the main spot on the disk 17.

The photodetector 20 receives the reflection beams of the side spots on the optical disk 17 and outputs, to the tracking error detector 22, signals indicating intensities (or amounts of light) of the reflection beams. The tracking error detector 22 outputs a tracking error signal in response to the signals from the photodetector 20 by using a tracking error signal detection according to the present invention which will be described later.

As shown in FIG. 1, the beam converting system 21 includes a grating 13 which converts the emission beam from the laser diode 12 into five diffracted light beams. A collimator lens 14 converts the diffracted light beams from the grating 13 into parallel light beams. A polarization beam splitter 15 converts the parallel light beams from the collimator lens 14 into linearly polarized light beams passing through the beam splitter 15. Further, the polarization beam splitter 15 converts reflection beams, directed from the disk 17 to the polarization beam splitter 15, into lateral reflection beams. A quarter wave plate 16 converts the linearly polarized light beams from the polarization beam splitter 15 into circularly polarized light beams. Further, the quarter wave plate 16 converts the circularly polarized light beams, directed from the disk 17 to the quarter wave plate 16, into linearly polarized light beams. An objective lens 18 directs the circularly polarized light beams from the quarter wave plate 16 to a track of the optical disk 17. A focusing lens 19 directs the lateral reflection beams from the polarization beam splitter 15 to the photodetector 20.

In the optical pickup device of FIG. 1, an actuator for performing focusing and tracking control of the objective lens 18 and a focusing error detecting system are omitted, for the sake of simplicity of description.

As described above, the emission beam from the laser diode 12 is converted by the grating 13 into the five diffracted light beams. One of these beams becomes a main beam which is used to detect information of the disk 17, and the other beams become side beams which are used to detect a tracking error of the main beam on the disk 17. The diffracted light beams from the grating 13 are converted into the parallel light beams by the collimator lens 14, and they are directed to the quarter wave plate 16 via the polarization beam splitter 15.

The linearly polarized light beams from the polarization beam splitter 15 are converted into the circularly polarized light beams by the quarter wave plate 16. The circularly polarized light beams from the quarter wave plate 16 are directed to a track of the disk 17 by the objective lens 18. The reflection beams from the disk 17 are the circularly polarized light beams directed in the opposite direction to the objective lens 18. The circularly polarized light beams from the objective lens 18 are converted into the linearly polarized light beams, and they enter the polarization beam splitter 15.

The polarization beam splitter 15 separates the reflection beams, directed from the quarter wave plate 16, from the emission beams from the collimator lens 14, and converts such reflection beams into the lateral reflection beams. The focusing lens 19 directs the lateral reflection beams from the polarization beam splitter 15 to the photodetector 20. The photodetector 20 outputs, to the tracking error detector 22, the signals indicating the intensities of the reflection beams from the focusing lens 19.

The grating 13 in the present embodiment is a transmission diffraction grating having a number of very fine parallel slits provided therein. The grating 13 converts the emission beam from the laser diode 12 into the five diffracted light beams. One of these beams becomes the main beam MB which is used to detect information of the disk 17, and the other beams become the side beams SB1–SB4 which are used to detect a tracking error of the main beam on the disk 17.

Figure 2:
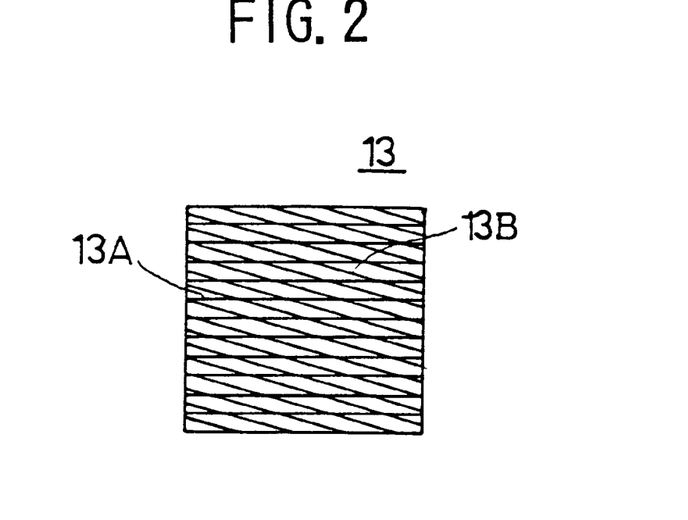
FIG. 2 is an enlarged view of a grating having a first pattern used in the optical pickup device.
Figure 3:
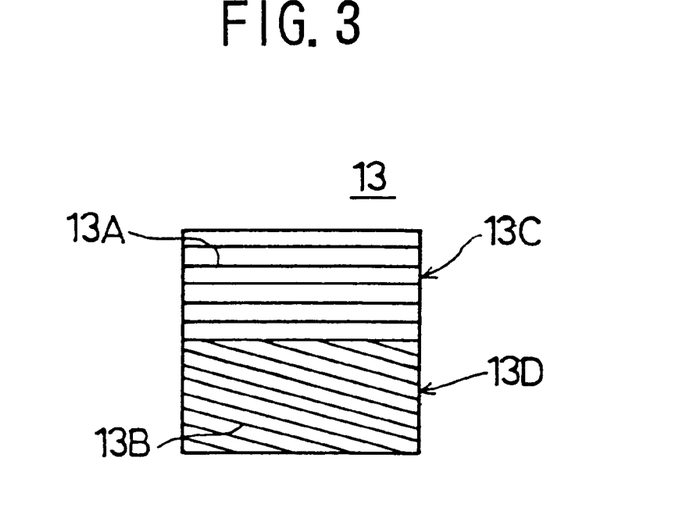
FIG. 3 is an enlarged view of a grating having a second pattern used in the optical pickup device.

In the optical pickup device 11 of the present embodiment, the grating 13 having either one of a first pattern, shown in FIG. 2, and a second pattern, shown in FIG. 3, is used.

As shown in FIG. 2, in the first pattern of the grating 13, there are provided first slits 13A including a plurality of very fine parallel slits to produce the main beam MB, the side beam SB1 and the side beam SB4 from the emission beam from the laser diode 12, and second slits 13B including a plurality of very fine parallel slits to produce the main beam MB, the side beam SB2 and the side beam SB3 from the emission beam from the laser diode 12. The first slits 13A extend in parallel in a lateral direction of the grating 13. The second slits 13B extend in parallel in a slanted direction such that the first slits 13A and the second slits 13B intersect each other in the grating 13.

As shown in FIG. 3, the grating 13 having the second pattern is provided with a first grating 13C and a second grating 13D which are connected together and coplanar with each other. The first grating 13C is provided with the first slits 13A including a plurality of very fine parallel slits to produce the main beam MB, the side beam SB1 and the side beam SB4 by using the emission beam from the laser diode 12. The second grating 13D is provided with the second slits 13B including a plurality of very fine parallel slits to produce the main beam MB, the side beam SB2 and the side beam SB3 by using the emission beam from the laser diode 12. The first slits 13A extend in parallel in a lateral direction of the grating 13. The second slits 13B extend in parallel in a slanted direction.

Figure 4:
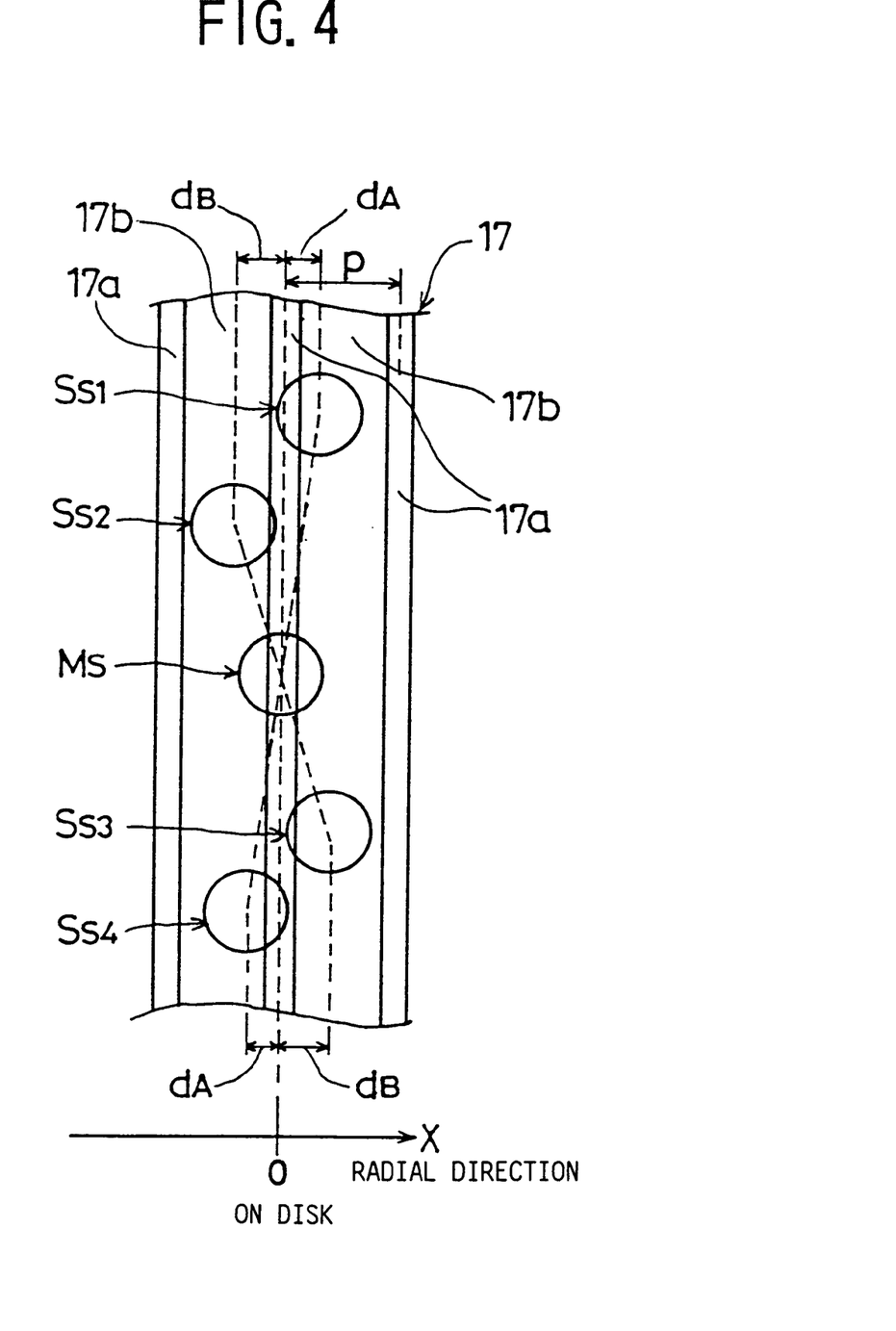
FIG. 4 is a diagram for explaining a main spot and side spots provided on an optical disk by the optical pickup device.

FIG. 4 shows a main spot "MS" and plural side spots "SS1"–"SS4" provided on the optical disk 17 by the optical pickup device 11 of the present embodiment.

As shown in FIG. 4, on the surface of the optical disk 17, grooves 17a and lands 17b are alternatively provided in a radial direction "X" of the disk 17. Tracks of the optical disk 17 are formed by the grooves 17a. The grooves 17a in the optical disk 17 are provided with a radial pitch "p" between two of the grooves 17a.

The grooves 17a of the disk 17 are shown in FIG. 4 as straight lines. However, the grooves 17a are actually curved lines.

As shown in FIG. 4, the main spot MS and the side spots SS1–SS4 are provided on the disk 17 by the main beam MB and the side beams SB1–SB4 beams from the beam converting system 21. In the example of FIG. 4, when the main spot MS is located at the center of one of the grooves 17a in the disk 17, the side spots SS1 and SS4 and the side spots SS2 and SS3 are respectively located at symmetrical positions around the main spot MS. When the main spot MS is located at the center of one of the grooves 17a in the disk 17, the side spot SS1 is located at an inner preceding position to the main spot MS, the side spot SS2 is located at an outer preceding position to the main spot MS, the side spot SS3 is located at an inner following position to the main spot MS, and the side spot SS4 is located at an outer following position to the main spot MS. At the same time, the side spots SS1 and SS4 and the side spots SS2 and SS3 are respectively located at symmetrical positions around the main spot MS.

In FIG. 4, a radial distance "dA" between the center of the side spot SS1 (or SS4) and the center of the main spot MS, and a radial distance "dB" between the center of the side spot SS2 (or SS3) and the center of the main spot MS are shown as dA<dB. However, in the present embodiment of the optical pickup device 11, the main spot MS and the side spots SS1–SS4 are provided on the disk 17 by the beam converting system 21 such that the radial distance dA and the radial distance dB are equal to each other (dA=dB), which will be described later.

By using the beam converting system 21 of the present embodiment, the main spot MS and the side spots SS1–SS4 are provided on the disk 17 by the main beam MB and the side beams SB1–SB4 beams in the above-described manner (dA=dB). It is possible for the present embodiment of the optical pickup device 11 to eliminate the offset caused by the phase deviation of the reflection beams of the side spots on the disk 17.

Figure 5:
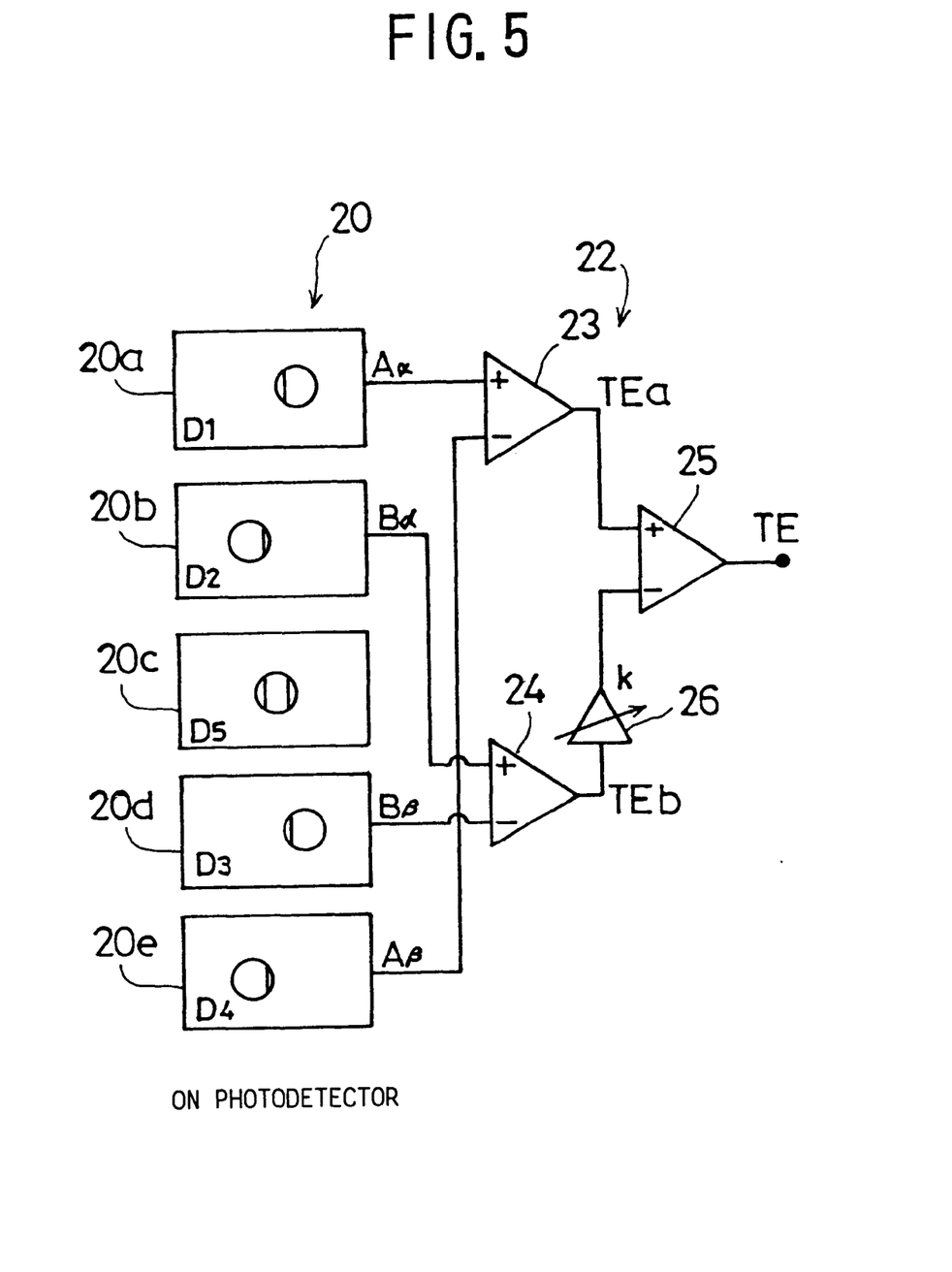
FIG. 5 is a diagram of a photodetector and a tracking error detector used in the optical pickup device.

FIG. 5 shows the photodetector 20 and the tracking error detector 22 used in the optical pickup device 11 of the present embodiment.

As shown in FIG. 5, the photodetector 20 includes first through fifth photodetecting elements 20a–20e. In FIG. 5, "D1" through "D5" indicate the relative positions of the respective photodetecting elements within the photodetector 20 (indicated by the rectangular block) to which the reflection beams from the focusing lens 19 are directed (indicated by the circles). The photodetecting elements 20a–20e are provided at the indicated positions in the photodetector 20 as shown in FIG. 5.

In the photodetector 20 of FIG. 5, the first photodetecting element 20a receives the reflection beam of the side spot SS1 on the disk 17, and outputs, to the tracking error detector 22, a signal "Aα" indicating the intensity of the reflection beam. The second photodetecting element 20b receives the reflection beam of the side spot SS2 on the disk 17, and outputs to the tracking error detector 22 a signal "Bα" indicating the intensity of the reflection beam.

The third photodetecting element 20c receives the reflection beam of the main spot MS on the disk 17. A signal output from the third photodetecting element 20c is used to detect the information of one of the grooves 17a of the disk 17. However, in the present embodiment of the tracking error detector 22, the output signal of the photodetecting element 20c is not used.

Further, in the photodetector 20 of FIG. 5, the fourth photodetecting element 20d receives the reflection beam of the side spot SS3 on the disk 17, and outputs to the tracking error detector 22 a signal "Bβ" indicating the intensity of the reflection beam. The fifth photodetecting element 20e receives the reflection beam of the side spot SS4 on the disk 17, and outputs to the tracking error detector 22 a signal "Aβ" indicating the intensity of the reflection beam.

As shown in FIG. 5, the tracking error detector 22 includes a first differential amplifier 23, a second differential amplifier 24, a third differential amplifier 25, and a variable-gain amplifier 26. The output of the photodetecting element 20a is connected to a non-inverting input of the differential amplifier 23, and the output of the photodetecting element 20e is connected to an inverting input of the differential amplifier 23. The output of the photodetecting element 20b is connected to a non-inverting input of the differential amplifier 24, and the output of the photodetecting element 20d is connected to an inverting input of the differential amplifier 24. An output of the differential amplifier 23 is connected to a non-inverting input of the differential amplifier 25. An output of the differential amplifier 24 is connected to an inverting input of the differential amplifier 25 via the variable-gain amplifier 26.

In the tracking error detector 22, the signal Aα output from the photodetecting element 20a and the signal Aβ output from the photodetecting element 20e are supplied to the differential amplifier 23, and the differential amplifier 23 outputs a signal "TEa" indicating a difference between the signal Aα and the signal Aβ. The signal Bα output from the photodetecting element 20b and the signal Bβ output from the photodetecting element 20d are supplied to the differential amplifier 24, and the differential amplifier 24 outputs a signal "TEb" indicating a difference between the signal Bα and the signal Bβ. The variable-gain amplifier 26 outputs a signal indicating a multiplication of the output signal TEb of the differential amplifier 24 by a gain "k" of the variable-gain amplifier 26. Further, the signal TEa output from the differential amplifier 23 and the signal k·TEb output from the variable-gain amplifier 26 are supplied to the differential amplifier 25, and the differential amplifier 25 outputs a tracking error signal "TE" indicating a difference between the signal TEa and the signal k·TEb. That is, the tracking error signal TE at the output of the differential amplifier 25 is determined by the equation: TE=TEa−k·TEb.

When the main spot MS is located at the center of one of the grooves 17a of the disk 17 and the side spots SS1–SS4 are located at the symmetrical positions around the main spot MS during an operation of the optical pickup device 11 in a reading mode, both the signal TEa from the differential amplifier 23 and the signal TEb from the differential amplifier 24 are equal to zero. The tracking error signal TE at the output of the tracking error detector 22 is equal to zero. In this case, it is not necessary to perform the tracking servo control by the optical pickup device 11 based on the tracking error signal TE.

On the other hand, when the main spot MS deviates from the center of one of the grooves 17a of the disk 17 and the side spots SS1–SS4 are located at the symmetrical positions around the main spot MS, the tracking error detector 22 outputs a tracking error signal TE based on the difference between the signal TEa from the differential amplifier 23 and the signal TEb from the differential amplifier 24, in accordance with the equation TE=TEa−k·TEb. In this case, the tracking servo control is performed based on the tracking error signal TE output from the optical pickup device 11.

Next, a description will be given of the detection of a tracking error signal by the optical pickup device 11 of the present embodiment.

First, it is assumed that a signal Io output by the photodetecting element 20c can be defined by a sine wave representation when the main spot MS has been moved in a radial direction of the disk 17 to cross a track of the disk 17 and the reflection beam of the main spot MS has entered the photodetecting element 20c. The signal Io at the output of the photodetecting element 20c is called a track crossing signal. The amplitude of the signal Io becomes a minimum when the main spot MS is located at the center of one of the grooves 17a in the disk 17, and it becomes a maximum when the main spot MS is located at the center of one of the lands 17b in the disk 17. Accordingly, the signal Io is represented by the following formula:

$$Io = c + a \cdot \cos(2\pi x/p) \qquad (2)$$

where "c" is a DC (direct current) component, "a" is the amplitude of the signal, "x" is a position of the main spot MS in a radial direction of the disk, and "p" is a radial pitch between the grooves 17a in the disk.

As described above, the main spot MS and the side spots SS1–SS4 are provided on the optical disk 17 by the emission beams passed through the same objective lens 18. Supposing that ratios of the intensities of the reflection beams of the side spots SS1 (or SS4) and SS2 (or SS3) on the optical disk 17 to the intensity of the reflection beam of the main spot MS are indicated by ΓA and ΓB, the relationship between the intensities of the reflection beams of the main spot MS, the side spot SS1 (or SS4), and the side spot SS2 (or SS3) is as follows:

$$MS:SS1:SS2 = 1:\Gamma A:\Gamma B$$

$$MS:SS4:SS3 = 1:\Gamma A:\Gamma B \qquad (3)$$

Herein, the optical pickup device 11 which is operating in a writing mode in which information is written to a blank area of a track of a write-once optical disk or an erasable optical disk will be considered. Suppose that the first and second side spots SS1 and SS2 are located near the blank area of the track of the disk (the write-once optical disk or the erasable optical disk) at the preceding positions to the main spot MS and the third and fourth side spots SS3 and SS4 are located near the recorded area of the track of the disk at the following positions to the main spot MS. That is, the main spot MS is at the boundary between the blank area and the recorded area in the disk.

As shown in FIG. 4, the radial distance between the center of the side spot SS1 (or SS4) and the center of the main spot MS is indicated by "dA", and the radial distance between the center of the side spot SS2 (or SS3) and the center of the main spot MS by "dB".

Supposing that $E\alpha$ denotes a reflectivity of the blank area in the disk and $E\beta$ denotes a reflectivity of the recorded area in the disk, the reflectivity $E\alpha$ of the blank area and the reflectivity $E\beta$ of the recorded area are different. A ratio of the reflectivity of the blank area to the reflectivity of the recorded area which is indicated by $E\alpha:E\beta$ will have to be taken into account.

In the above-mentioned case, the output signals $A\alpha$, $A\beta$, $B\alpha$ and $B\beta$ of the photodetecting elements 20$a$, 20$e$, 20$b$ and 20$d$ in the photodetector 20 are derived from the output signal Io of the photodetecting element 20$c$ for the reflection beam of the main spot MS by multiplying the signal Io by the related intensity as well as the related reflectivity and by shifting the position related to the main spot to the position of the related side spot in the radial direction of the disk by either the distance $\pm$dA or the distance $\pm$dB. That is, the output signals $A\alpha$, $A\beta$, $B\alpha$ and $B\beta$ of the photodetecting elements 20$a$, 20$e$, 20$b$ and 20$d$ are as follows:

$$A\alpha = \Gamma A \cdot E\alpha \cdot \{c + a \cdot \cos[2\pi(x+dA)/p]\} \qquad (4)$$

$$A\beta = \Gamma A \cdot E\beta \cdot \{c + a \cdot \cos[2\pi(x-dA)/p]\} \qquad (5)$$

$$B\alpha = \Gamma B \cdot E\alpha \cdot \{c + a \cdot \cos[2\pi(x-dB)/p]\} \qquad (6)$$

$$B\beta = \Gamma B \cdot E\beta \cdot \{c + a \cdot \cos[2\pi(x+dB)/p]\} \qquad (7)$$

As described above, the tracking error signal TE at the output of the tracking error detector 22 is determined by the following equation:

$$TE = TEa - k \cdot TEb \qquad (8)$$
$$= (A\alpha - A\beta) - k \cdot (B\alpha - B\beta)$$

Substituting the formulas (4) through (7) into the above equation (8) yields:

$$TE = c(\Gamma A - k \cdot \Gamma B)(E\alpha - E\beta) + \qquad (9)$$
$$a(E\alpha - E\beta)\{\Gamma A \cdot \cos(2\pi dA/p) - k \cdot \Gamma B \cdot \cos(2\pi dB/p)\}\cos(2\pi x/p) -$$
$$a(E\alpha + E\beta)\{\Gamma A \cdot \sin(2\pi dA/p) + k \cdot \Gamma B \cdot \sin(2\pi dB/p)\}\sin(2\pi x/p)$$

In the above formula (9): the first term "c ($\Gamma A - k \cdot \Gamma B$) ($E\alpha - E\beta$)" is the DC offset caused by the different reflectivities of the blank area and the recorded area in the disk in the writing mode; the second term "a ($E\alpha - E\beta$) {$\Gamma A \cdot \cos$(2$\pi$dA/p)$-$k$\cdot\Gamma$B$\cdot$cos(2$\pi$dB/p)} cos(2$\pi$x/p)" is the offset caused by the phase deviation; and the third term "a ($E\alpha + E\beta$){$\Gamma A \cdot \sin$(2$\pi$dA/p)+k$\cdot\Gamma$B$\cdot$sin(2$\pi$dB/p)} sin(2$\pi$x/p)" is the theoretical tracking error signal.

In a case in which the optical pickup device 11 is operating in the writing mode with the read-only optical disk such as CD, the reflectivity of the disk is constant. That is, $E\alpha = E\beta$. Therefore, the DC offset is not produced in such a case. However, in the case in which the optical pickup device 11 is operating in the writing mode in which data is written to the blank area of the track of the write-once optical disk or the erasable optical disk, the reflectivities $E\alpha$ and $E\beta$ of the blank area and the recorded area in the disk are different. Therefore, the DC offset will be produced due to the different reflectivities.

In the present embodiment of the tracking error detector 22, the variable-gain amplifier 26 is adjusted such that the gain "k" of the variable-gain amplifier 26 is equal to the ratio of $\Gamma A$ to $\Gamma B$ (k=$\Gamma A/\Gamma B$). Therefore, it is possible for the optical pickup device 11 of the present embodiment to effectively eliminate the DC offset.

When the variable-gain amplifier 26 is set such that the gain k is equal to the ratio of $\Gamma A$ to $\Gamma B$ (k=$\Gamma A/\Gamma B$), the resulting signal TE is as follows:

$$TE = a \cdot \Gamma A \cdot (E\alpha - E\beta)\{\cos(2\pi dA/p) - \cos(2\pi dB/p)\}\cos(2\pi x/p) - \qquad (10)$$
$$a \cdot \Gamma A \cdot (E\alpha + E\beta)\{\sin(2\pi dA/p) + \sin(2\pi dB/p)\}\sin(2\pi x/p)$$

Further, in the present embodiment, the main spot MS and the side spots SS1–SS4 are provided on the disk by the beam converting system 21 such that the radial distance dA and the radial distance dB are equal to each other (dA=dB). Therefore, it is possible for the optical pickup device 11 of the present embodiment to effectively eliminate the offset caused by the phase deviation.

When the beam converting system 21 provides the main spot MS and the side spots SS1–SS4 on the disk such that the radial distance dA and the radial distance dB are equal to each other (dA=dB), the resulting signal TE is as follows:

$$TE = -2 \cdot a \cdot \Gamma A \cdot (E\alpha + E\beta) \cdot \sin(2\pi dA/p) \cdot \sin(2\pi x/p) \qquad (11)$$

From the above formula (11), it is readily understood that, if the beam converging system 21 is constructed to provide the main spot MS and the side spots SS1–SS4 on the disk such that the radial distance dA and the radial distance dB are equal to ¼ of the radial pitch "p" between the grooves 17$a$, the amplitude of the tracking error signal TE is the maximum. Therefore, in the present embodiment, the main spot MS and the side spots SS1–SS4 are provided on the disk by the beam converting system 21 such that the radial distance dA and the radial distance dB are equal to ¼ of the radial pitch "p" between the grooves 17$a$ (dA=dB=p/4). For the purpose of detecting a tracking error signal, it is desirable that the tracking error signal TE at the output of the tracking error detector 22 has a maximum level of amplitude.

As described above, in the optical pickup device 11 of the present embodiment, it is possible to eliminate the DC offset as well as the offset caused by the phase deviation. In addition, the tracking error detector 22 outputs a tracking error signal based on the amounts of light of the reflection beams of the side spots on the disk 17 as in the above formula (8), and it is possible for the optical pickup device 11 of the present embodiment to effectively prevent the tracking error signal from containing the offset caused by a radial shift of the objective lens 18. Therefore, the optical pickup device 11 of the present embodiment can accurately detect a tracking error signal even when data is written to a blank area of a write-once optical disk or an erasable optical disk.

Figures 6, 6A, 6B:
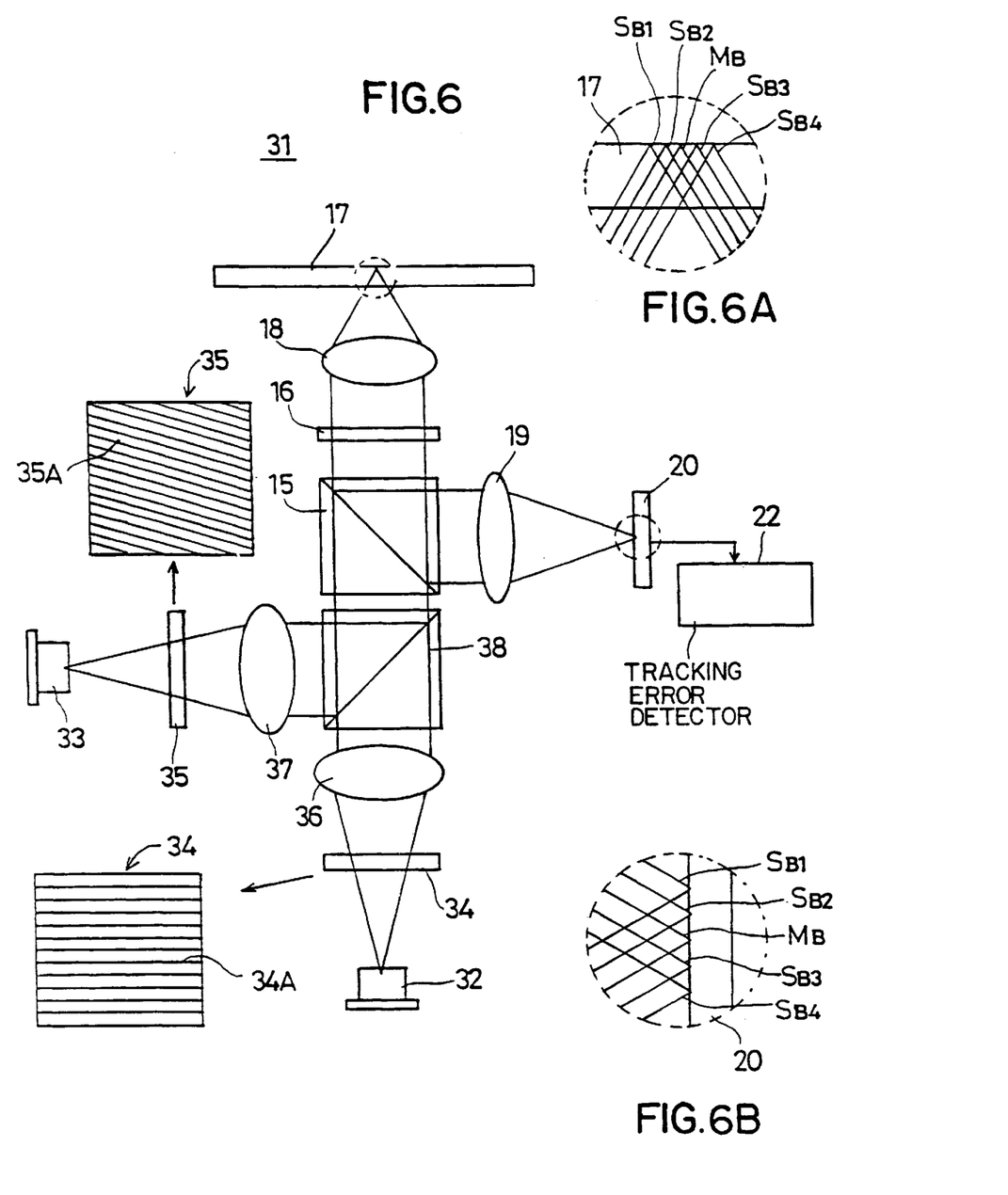
FIG. 6 is a diagram of a second embodiment of the optical pickup device of the present invention.

Next, FIG. 6 shows a second embodiment of the optical pickup device of the present invention. In FIG. 6, the elements which are the same as corresponding elements in FIG. 1 are designated by the same reference numerals, and a description thereof will be omitted.

As shown in FIG. 6, an optical pickup device 31 of this embodiment comprises another light source, another beam converting system, the photodetector 20, and the tracking error detector 22.

In the optical pickup device 31, the light source comprises a pair of laser diodes (or semiconductor lasers) 32 and 33. The laser diodes 32 and 33 emit laser beams having different wavelengths.

The beam converting system of this embodiment comprises a pair of gratings 34 and 35, a pair of collimator lenses 36 and 37, and a dichroic mirror 38. Other elements in the beam converting system than mentioned above are the same as corresponding elements in the first embodiment of FIG. 1.

The grating 34 converts the laser beam emitted by the laser diode 32 into three diffracted light beams, and these diffracted light beams provide the main beam MB and the first and fourth side beams SB1 and SB4. The grating 35 converts the laser beam emitted by the laser diode 33 into three diffracted light beams, and these diffracted light beams provide the main beam MB and the second and third side beams SB2 and SB3.

The grating 34 in this embodiment is a transmission diffraction grating having a number of very fine parallel slits provided therein. The grating 34 has a first pattern similar to the first pattern of the grating 13 in the previous embodiment of FIG. 1. In the first pattern of the grating 34, there are provided first slits 34A including a plurality of very fine parallel slits to produce the main beam MB, the side beam SB1 and the side beam SB4 from the emission beam from the laser diode 32. The first slits 34A extend in parallel in a lateral direction of the grating 34.

The grating 35 in this embodiment is also a transmission diffraction grating having a number of very fine parallel slits provided therein. The grating 35 has a second pattern similar to the second pattern of the grating 13 in the previous embodiment of FIG. 1. In the second pattern of the grating 35, there are provided second slits 35A including a plurality of very fine parallel slits to produce the main beam MB, the side beam SB2 and the side beam SB3 from the emission beam from the laser diode 33. The second slits 35A extend in parallel in a slanted direction, and the slanted direction of the second slits 35A is at a predetermined angle to the direction of the first slits 34A.

Accordingly, the main beam MB, the first side beam SB1 and the fourth side beam SB4 from the grating 34 are directed to the collimator lens 36, and the main beam MB, the second side beam SB2 and the third side beam SB3 from the grating 35 are directed to the collimator lens 37.

The collimator lens 36 converts the diffracted light beams from the grating 34 into three parallel light beams, and these beams are directed to the dichroic mirror 38. Similarly, the collimator lens 37 converts the diffracted light beams from the grating 37 into three parallel light beams, and these beams are directed to the dichroic mirror 38.

The dichroic mirror 38 serves to reflect the laser beam, directed from the laser diode 33, to the beam splitter 15, and serves to transmit the laser beam, directed from the laser diode 32, through the dichroic mirror 38 to the beam splitter 15. As described above, the wavelengths of the laser beams emitted by the laser diodes 32 and 33 are different, and the dichroic mirror 38 carries out the above functions. By the above functions, the dichroic mirror 38 combines the beams from the collimator lens 34 and the beams from the collimator lens 37 to produce the main beam MB and the side beams SB1–SB4.

In the dichroic mirror 38, one of the beams from the grating 34 and one of the beams from the grating 35 are combined to produce the main beam MB. The intensity of the main beam MB directed to the optical disk 17 in the present embodiment is doubled from that in the previous embodiment of FIG. 1.

The polarization beam splitter 15 converts the beams from the dichroic mirror 38 into linearly polarized light beams passing through the beam splitter 15. Further, the polarization beam splitter 15 converts reflection beams, directed from the disk 17 to the beam splitter 15, into lateral reflection beams. The quarter wave plate 16 converts the linearly polarized light beams from the beam splitter 15 into circularly polarized light beams. Further, the quarter wave plate 16 converts the circularly polarized light beams, directed from the disk 17 to the quarter wave plate 16, into linearly polarized light beams. The objective lens 18 directs the circularly polarized light beams from the quarter wave plate 16 to a track of the optical disk 17. The focusing lens 19 directs the lateral reflection beams from the polarization beam splitter 15 to the photodetector 20.

In the optical pickup device 31, the linearly polarized light beams from the polarization beam splitter 15 are converted into the circularly polarized light beams by the quarter wave plate 16. The circularly polarized light beams from the quarter wave plate 16 are directed to a track of the disk 17 by the objective lens 18. Therefore, the above beam converting system produces the main beam MB and the side beams SB1–SB4 from the laser beams emitted by the laser diodes 32 and 33 so that the main spot MS and the side spots SS1–SS4 are provided on the optical disk 17 by the main beam MB and the side beams SB1–SB4. Similar to the previous embodiment of FIG. 1, the beam converting system of this embodiment provides the main spot MS and the side spots SS1–SS4 on the disk 17, as shown in FIG. 4, such that, when the main spot MS is located at the center of one of the grooves 17a in the disk 17, the side spot SS1 is located at an inner preceding position to the main spot MS, the side spot SS2 is located at an outer preceding position to the main spot MS, the side spot SS3 is located at an inner following position to the main spot MS, and the side spot SS4 is located at an outer following position to the main spot MS. At the same time, the side spots SS1 and SS4 and the side spots SS2 and SS3 are respectively located at symmetrical positions around the main spot MS.

The reflection beams from the disk 17 are the circularly polarized light beams directed in the opposite direction to the objective lens 18. The circularly polarized light beams from the objective lens 18 are converted into the linearly polarized light beams, and these beams enter the polarization beam splitter 15.

The polarization beam splitter 15 separates the reflection beams, directed from the quarter wave plate 16, from the emission beams from the dichroic mirror 38, and converts such reflection beams into the lateral reflection beams. The focusing lens 19 directs the lateral reflection beams from the polarization beam splitter 15 to the photodetector 20. The photodetecting elements 20a–20e in the photodetector 20 output, to the tracking error detector 22, the signals indicating the intensities of the reflection beams from the focusing lens 19.

When the above-described optical pickup device 31 is operating in the writing mode to write data to the optical disk 17, it is necessary that the laser beams having the same level of intensity (or the same amount of light) be emitted by the laser diodes 32 and 33 in synchronization. In a case in which it is difficult to make the intensities of the laser beams from the laser diodes 32 and 33 equal, a variable-gain amplifier may be used in the optical pickup device 31 to provide a gain that is adjusted to be equal to a ratio of the intensity of the laser beam from the laser diode 32 to the intensity of the laser beam from the laser diode 33.

In the above-described optical pickup device 31, the grating 34 converts the laser beam from the laser diode 32 into three diffracted light beams and the grating 35 converts the laser beam from the laser diode 33 into three diffracted light beams. The dichroic mirror 38 combines one of the beams from the grating 34 and one of the beams from the grating 35 to produce the main beam MB. The intensity of the main beam MB directed to the optical disk 17 in the present embodiment is doubled from that in the previous embodiment of FIG. 1 using a single laser diode. For this reason, it is possible to set the power consumption of the laser diodes 32 and 33 in the optical pickup device 31 at a level lower than the level of the power consumption of the laser diode 12 in the optical pickup device 11.

Figures 7, 7A, 7B:
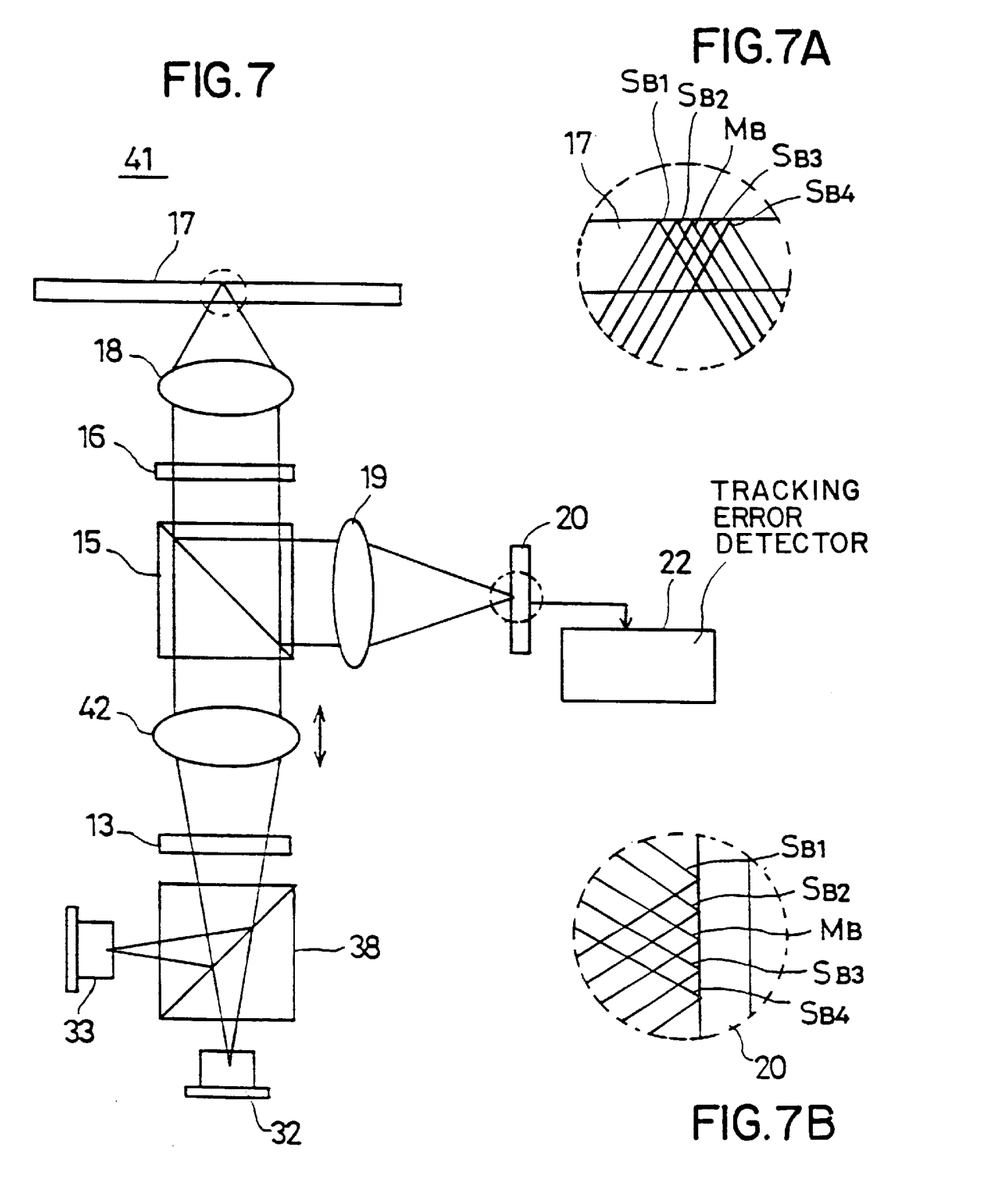
FIG. 7 is a diagram of a third embodiment of the optical pickup device of the present invention.

Next, FIG. 7 shows a third embodiment of the optical pickup device of the present invention. In FIG. 7, the elements which are the same as corresponding elements in FIG. 1 are designated by the same reference numerals, and a description thereof will be omitted.

As shown in FIG. 7, an optical pickup device 41 of this embodiment comprises the light source (which is the same as the light source in the second embodiment), a different beam converting system, the photodetector 20, and the tracking error detector 22.

In the optical pickup device 41, the light source comprises the pair of laser diodes 32 and 33. Similar to the embodiment of FIG. 6, the laser diodes 32 and 33 emit laser beams having different wavelengths.

The beam converting system of this embodiment comprises the dichroic mirror 38 (which is the same as the dichroic mirror 38 in the second embodiment) and a relay lens 42. Other elements in the beam converting system than mentioned above are the same as corresponding elements in the first embodiment of FIG. 1.

The dichroic mirror 38 in this embodiment reflects the laser beam, directed from the laser diode 33, to the grating 13, and transmits the laser beam, directed from the laser diode 32, through the dichroic mirror 38 to the grating 13. As described above, the wavelengths of the laser beams emitted by the laser diodes 32 and 33 are different, and the dichroic mirror 38 carries out the above functions.

The grating 13 converts the laser beams from the dichroic mirror 38 into five diffracted light beams, as in the previous embodiment of FIG. 1.

The relay lens 42 converts the diffracted light beams from the grating 13 by a magnification factor adjusted in response to the wavelength of the emitted laser beam, and the converted beams are directed to the polarization beam splitter 15. In the present embodiment, the relay lens 42 is moved in a direction along an optical axis of the relay lens 42 by an actuator (not shown) in response to the wavelength of the laser beam emitted by one of the laser diodes 32 and 33. One of the laser diodes 32 and 33 is selected in accordance with a track pitch of the optical disk 17 being accessed. Thus, the magnification factor by the relay lens 42 is adjusted in response to the wavelength of the emitted laser beam.

By the above-mentioned functions of the dichroic mirror 38 and the relay lens 42, the beam converting system of this embodiment provides the main spot MS and the side spots SS1–SS4 on the optical disk 17, as shown in FIG. 4, in accordance with the track pitch of the optical disk 17 being accessed. That is, when the main spot MS is located at the center of one of the grooves 17a in the disk 17, the side spot SS1 is located at an inner preceding position to the main spot MS, the side spot SS2 is located at an outer preceding position to the main spot MS, the side spot SS3 is located at an inner following position to the main spot MS, and the side spot SS4 is located at an outer following position to the main spot MS. At the same time, the side spots SS1 and SS4 and the side spots SS2 and SS3 are respectively located at symmetrical positions around the main spot MS as shown in FIG. 4.

Other functions of the optical pickup device 41 of this embodiment are substantially the same as those of the optical pickup devices 11 and 31 of the previous embodiments, and a duplicate description will be omitted.

In the optical pickup device 41 of the present embodiment, it is possible to read information from and write information to either one of two types of optical disk having different track pitches. That is, a user in front of an optical disk drive including the optical pickup device 41 is allowed to select either one of the two types of optical disk for recording of data to or reproduction of data from the selected optical disk.

For example, when an optical disk 17 having a first track pitch is accessed by the optical pickup device 41, the laser diode 32 is turned ON and the laser diode 33 is turned OFF. The laser beam from the laser diode 32 is transmitted through the dichroic mirror 38. The diffracted light beams from the grating 13 are converted by the relay lens 42 by a magnification factor adjusted in response to the wavelength of the emitted laser beam. Therefore, the beam converting system of this embodiment provides the main spot MS and the side spots SS1–SS4 on the optical disk 17, as shown in FIG. 4, in accordance with the first track pitch of the optical disk 17.

Further, when an optical disk 17 having a second track pitch is accessed by the optical pickup device 41, the laser diode 32 is turned OFF and the laser diode 33 is turned ON. The laser beam from the laser diode 33 is reflected to the relay lens 42 by the dichroic mirror 38. The diffracted light beams from the grating 13 are converted by the relay lens 42 by a magnification factor adjusted in response to the wavelength of the emitted laser beam. Therefore, the beam converting system of this embodiment provides the main spot MS and the side spots SS1–SS4 on the optical disk 17, as shown in FIG. 4, in accordance with the second track pitch of the optical disk 17.

In the above-described third embodiment, the two laser diodes 32 and 33 are used as one example of the light source in the optical pickup device. The present invention is not limited to this embodiment, and variations of the light source may be used according to the present invention. Three or more laser diodes in combination may be used as the light source in the optical pickup device of the present invention.

The optical pickup devices 11, 31 and 41 as in the above-described embodiments may be embodied in various kinds of optical disk drive, such as a CD-ROM drive, a CD drive, a magneto-optical disk drive (MO), a write-once optical disk drive (CD-R), and an erasable optical drive (PD, CD-RW).

Further, the present invention is not limited to the above-described embodiments, and variations and modifications may be made without departing from the scope of the present invention.

What is claimed is:

1. An optical pickup device for detecting a tracking error, comprising:
   a pair of laser diodes for emitting laser beams having different wavelengths;
   a beam converting system for converting the light beams emitted by the laser diodes into a main beam and four side beams so that a main spot and first through fourth side spots are provided on an optical disk by the main beam and the side beams, wherein said first and said second side spots are at preceding positions to the main spot and said third and said fourth side spots are at following positions to the main spot, and wherein said first and said fourth side spots are symmetrical about the main spot and said second and said third side spots are symmetrical about the main spot;
   a photodetector having photodetecting elements for receiving reflection beams of said first through said fourth side spots and for outputting a first intensity-difference signal related to the reflection beams of the first and fourth side spots and a second intensity-difference signal related to the reflection beams of the second and third side spots; and
   a tracking error detector for outputting a tracking error signal based on a difference between the first intensity-difference signal related to the reflection beams of the first and fourth side spots and the second intensity-difference signal related to the reflection beams of the second and third side spots, the beam converting system including:
     a pair of gratings, each of said pair of gratings converting a light beam from one of the pair of laser diodes into three diffracted light beams;
     a pair of collimator lenses, each of said pair of collimator lenses converting the diffracted light beams from one of the pair of gratings into parallel light beams;
     a dichroic mirror for combining both the light beams from the pair of collimator lenses to produce the main beam and the four side beams;
     a polarization beam splitter for converting the beams from the collimator lens into linearly polarized light beams passing through the beam splitter, wherein said polarization beam splitter converts reflection beams, reflected from the disk to the polarization beam splitter, into lateral reflection beams;
     a quarter wave plate for converting the linearly polarized light beams from the polarization beam splitter into circularly polarized light beams, wherein said quarter wave plate converts the circularly polarized light beams, reflected from the disk to the quarter wave plate, into linearly polarized light beams;
     an objective lens for directing the circularly polarized light beams from the quarter wave plate to a track of the optical disk; and a focusing lens for directing the lateral reflection beams from the polarization beam splitter to the photodetector.

2. The optical pickup device according to claim 1, wherein said pair of gratings comprise:
   a first grating for converting the laser beam from one of the pair of laser diodes into three diffracted light beams, said diffracted light beams providing the main beam and the first and the fourth side beams; and
   a second grating for converting the laser beam from the other of the pair of laser diodes into three diffracted light beams, said diffracted light beams providing the main beam and the second and the third side beams.

3. The optical pickup device according to claim 2, wherein said first grating comprises first slits including a plurality of fine parallel slits to produce the main beam, the first side beam and the fourth side beam, said first slits extending in a lateral direction of the first grating, and wherein said second grating comprises second slits including a plurality of fine parallel slits to produce the main beam, the second side beam and the third side beam, said second slits extending in a slanted direction which is at a predetermined angle to the direction in which the first slits extend.

4. An optical pickup device for detecting a tracking error, comprising:
   a pair of laser diodes for emitting laser beams having different wavelengths;
   a beam converting system for converting the light beams emitted by the laser diodes into a main beam and four side beams so that a main spot and first through fourth side spots are provided on an optical disk by the main beam and the side beams, wherein said first and said second side spots are at preceding positions to the main spot and said third and said fourth side spots are at following positions to the main spot, and wherein said first and said fourth side spots are symmetrical about the main spot and said second and said third side spots are symmetrical about the main spot;
   a photodetector having photodetecting elements for receiving reflection beams of said first through said fourth side spots and for outputting a first intensity difference signal related to the reflection beams of the first and fourth side spots and a second intensity difference signal related to the reflection beams of the second and third side spots; and
   a tracking error detector for outputting a tracking error signal based on a difference between the first intensity-difference signal related to the reflection beams of the first and fourth side spots and the second intensity-difference signal related to the reflection beams of the second and third side spots,
   the beam converting system including:
     a dichroic mirror for reflecting a laser beam from one of the pair of laser diodes and for transmitting a laser beam from the other of the pair of laser diodes to pass through the dichroic mirror;
     a grating for converting the laser beam from the dichroic mirror into five diffracted light beams;
     a relay lens for converting the diffracted light beams from the grating by a magnification factor adjusted in response to a wavelength of the emitted laser beam, said relay lens being moved along an optical axis of the relay lens in response to the wavelength of the emitted laser beam, thereby adjusting the magnification factor;
     a polarization beam splitter for converting the beams from the relay lens into linearly polarized light beams passing through the beam splitter, wherein said polarization beam splitter converts reflection beams, reflected from the disk to the polarization beam splitter, into lateral reflection beams;
     a quarter wave plate for converting the linearly polarized light beams from the polarization beam splitter into circularly polarized light beams, wherein said quarter wave plate converts the circularly polarized light beams, reflected from the disk to the quarter wave plate, into linearly polarized light beams;

an objective lens for directing the circularly polarized light beams from the quarter wave plate to a track of the optical disk; and a focusing lens for directing the lateral reflection beams from the polarization beam splitter to the photodetector.

5. The optical pickup device according to claim 4, wherein said beam converting system provides the main spot and the first through the fourth side spots on the disk such that a distance between a center of one of the first and the fourth side spots and a center of the main spot in a radial direction of the disk and a distance between a center of one of the second and the third side spots and the center of the main spot in the radial direction of the disk are equal to each other.

6. The optical pickup device according to claim 4, wherein said beam converting system provides the main spot and the first through the fourth side spots on the disk such that both a distance between a center of one of the first and fourth side spots and a center of the main spot in a radial direction of the disk and a distance between a center of one of the second and third side spots and the center of the main spot in the radial direction of the disk are equal to ¼ of a radial pitch between two of the grooves in the disk.

7. The optical pickup device according to claim 1, wherein the photodetector includes:

a first photodetecting element for receiving a reflection beam of the main spot and outputting a signal indicating an intensity of the reflection beam of the main spot, a second photodetecting element for receiving a reflection beam of the first side spot and outputting a signal indicating an intensity of the reflection beam of the first side spot, a third photodetecting element for receiving a reflection beam of the second side spot and outputting a signal indicating an intensity of the reflection beam of the second side spot, a fourth photodetecting element for receiving a reflection beam of the third side spot and outputting a signal indicating an intensity of the reflection beam of the third side spot, and a fifth photodetecting element for receiving a reflection beam of the fourth side spot and outputting a signal indicating an intensity of the reflection beam of the fourth side spot.

8. The optical pickup device according to claim 7, wherein the tracking error detector includes:

a first amplifier for outputting a first intensity-difference signal indicating a difference between the signal output by the second photodetecting element and the signal output by the fifth photodetecting element, a second amplifier for outputting a second intensity-difference signal indicating a difference between the signal output by the third photodetecting element and the signal output by the fourth photodetecting element, and a third amplifier for outputting a tracking error signal based on a difference between the first intensity-difference signal output by the first amplifier and the second intensity-difference signal output by the second amplifier, said tracking error detector thus outputting the tracking error signal based on the difference between the first intensity-difference signal related to the reflection beams of the first and fourth side spots and the second intensity-difference signal related to the reflection beams of the second and third side spots.

9. The optical pickup device according to claim 8, wherein said tracking error detector further comprises a variable-gain amplifier, said variable-gain amplifier having an input connected to an output of the second amplifier and an output connected to an input of the third amplifier.

10. The optical pickup device according to claim 9, wherein said variable-gain amplifier provides a gain that is adjusted to be equal to a ratio of the intensity of one of the reflection beams of the first and the fourth side spots to the intensity of one of the reflection beams of the second and the third side spots.

11. The optical pickup device according to claim 1, wherein said beam converting system provides the main spot and the first through the fourth side spots on the disk such that a distance between a center of one of the first and the fourth side spots and a center of the main spot in a radial direction of the disk and a distance between a center of one of the second and the third side spots and the center of the main spot in the radial direction of the disk are equal to each other.

12. The optical pickup device according to claim 1, wherein said beam converting system provides the main spot and the first through the fourth side spots on the disk such that both a distance between a center of one of the first and fourth side spots and a center of the main spot in a radial direction of the disk and a distance between a center of one of the second and third side spots and the center of the main spot in the radial direction of the disk are equal to ¼ of a radial pitch between two of the grooves in the disk.

13. The optical pickup device according to claim 4, wherein the photodetector includes: a first photodetecting element for receiving a reflection beam of the main spot and outputting a signal indicating an intensity of the reflection beam of the main spot, a second photodetecting element for receiving a reflection beam of the first side spot and outputting a signal indicating an intensity of the reflection beam of the first side spot, a third photodetecting element for receiving a reflection beam of the second side spot and outputting a signal indicating an intensity of the reflection beam of the second side spot, a fourth photodetecting element for receiving a reflection beam of the third side spot and outputting a signal indicating an intensity of the reflection beam of the third side spot, and a fifth photodetecting element for receiving a reflection beam of the fourth side spot and outputting a signal indicating an intensity of the reflection beam of the fourth side spot.

14. The optical pickup device according to claim 13, wherein the tracking error detector includes:

a first amplifier for outputting a first intensity-difference signal indicating a difference between the signal output by the second photodetecting element and the signal output by the fifth photodetecting element, a second amplifier for outputting a second intensity-difference signal indicating a difference between the signal output by the third photodetecting element and the signal output by the fourth photodetecting element, and a third amplifier for outputting a tracking error signal based on a difference between the first intensity-difference signal output by the first amplifier and the second intensity-difference signal output by the second amplifier, said tracking error detector thus outputting the tracking error signal based on the difference between the first intensity-difference signal related to the reflection beams of the first and fourth side spots and the second intensity-difference signal related to the reflection beams of the second and third side spots.

15. The optical pickup device according to claim 14, wherein said tracking error detector further comprises a variable-gain amplifier, said variable-gain amplifier having an input connected to an output of the second amplifier and an output connected to an input of the third amplifier.

16. The optical pickup device according to claim 15, wherein said variable-gain amplifier provides a gain that is adjusted to be equal to a ratio of the intensity of one of the reflection beams of the first and the fourth side spots to the intensity of one of the reflection beams of the second and the third side spots.

* * * * *